(12) United States Patent
Enthaler et al.

(10) Patent No.: US 11,535,264 B2
(45) Date of Patent: Dec. 27, 2022

(54) METHOD FOR OPERATING A MOTOR VEHICLE

(71) Applicant: AUDI AG, Ingolstadt (DE)

(72) Inventors: Achim Enthaler, Ingolstadt (DE);
Michael Mürken, Ingolstadt (DE);
Andreas Thanheiser, Eichstätt (DE);
Johann Krammer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 16/332,705

(22) PCT Filed: Sep. 14, 2017

(86) PCT No.: PCT/EP2017/073093
§ 371 (c)(1),
(2) Date: Apr. 19, 2019

(87) PCT Pub. No.: WO2018/050729
PCT Pub. Date: Mar. 22, 2018

(65) Prior Publication Data
US 2019/0263422 A1    Aug. 29, 2019

(30) Foreign Application Priority Data
Sep. 16, 2016  (DE) .......................... 102016217770.2

(51) Int. Cl.
*B60W 50/00* (2006.01)
*G06F 3/01* (2006.01)
(Continued)

(52) U.S. Cl.
CPC ......... *B60W 50/0098* (2013.01); *G06F 3/013* (2013.01); *G06F 3/017* (2013.01);
(Continued)

(58) Field of Classification Search
CPC ...... B60W 30/09; B60W 10/18; B60W 10/20; B60W 50/0098; B60W 2540/041;
(Continued)

(56) References Cited

U.S. PATENT DOCUMENTS 6,701,143 B1   3/2004  Dukach et al.
9,194,168 B1  11/2015  Lu et al.
(Continued)

FOREIGN PATENT DOCUMENTS

CA    2847398 A1   11/2014
CN  102622578 A    8/2012
(Continued)

OTHER PUBLICATIONS

International Search Report and Written Opinion of the International Searching Authority directed to related International Patent Application No. PCT/EP2017/073093, dated Dec. 11, 2017, with attached English-language translation; 17 pages.
(Continued)

*Primary Examiner* — Sze-Hon Kong
*Assistant Examiner* — Chanmin Park
(74) *Attorney, Agent, or Firm* — Sterne, Kessler, Goldstein & Fox P.L.L.C.

(57) ABSTRACT

A method for operating a motor vehicle having a camera device that records the area ahead of the vehicle and an associated control device for evaluating images taken by the camera device, wherein the control device evaluates the images in order to detect at least one hand gesture performed by a person shown in the images, wherein, when a hand motion describing a calling gesture that indicates a stop request is detected, in the case of a self-driving motor vehicle, the motor vehicle is controlled to stop in the vicinity
(Continued)

Figure 1:
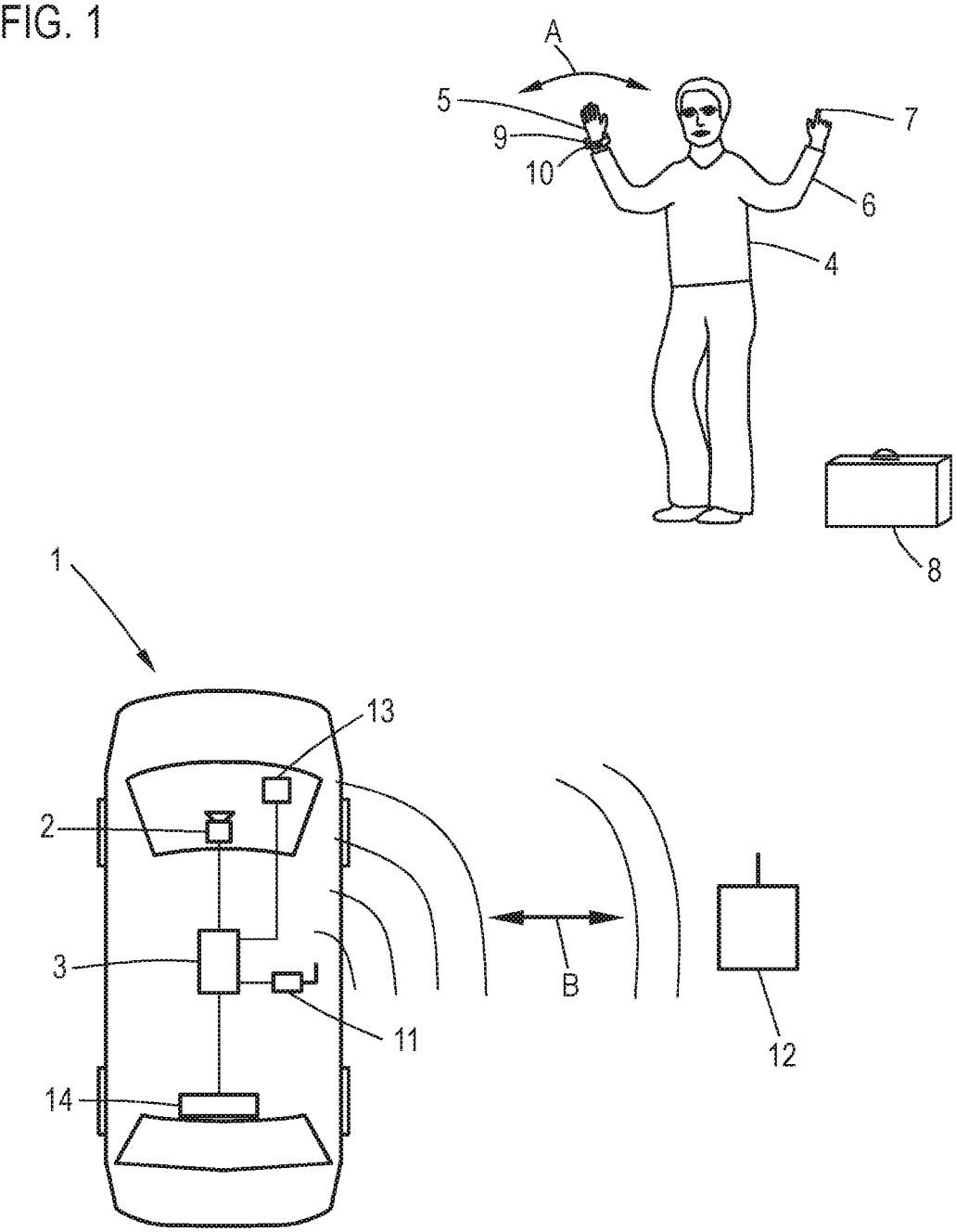

of the person, or in the case of a non-self-driving motor vehicle, the driver of the motor vehicle is given a signal indicating the stop request.

18 Claims, 2 Drawing Sheets

(51) Int. Cl.
    *G08G 1/0967*     (2006.01)
    *G07C 9/00*     (2020.01)
    *G06V 40/19*     (2022.01)
    *G06V 40/20*     (2022.01)
    *G06V 40/10*     (2022.01)

(52) U.S. Cl.
    CPC ............ *G06V 40/107* (2022.01); *G06V 40/19* (2022.01); *G06V 40/28* (2022.01); *G07C 9/00* (2013.01); *G08G 1/096716* (2013.01); *G08G 1/096725* (2013.01); *G08C 2201/32* (2013.01)

(58) Field of Classification Search
    CPC ........ B60W 60/0025; B60W 60/00253; B60Q 1/50; G06F 3/013; G06F 3/017; G06K 9/00355; G06K 9/00375; G06K 9/00604; G08C 2201/32
    See application file for complete search history.

(56) References Cited

U.S. PATENT DOCUMENTS

| | | | |
|---|---|---|---|
| 9,330,308 B2 | 5/2016 | Joo | |
| 9,336,436 B1* | 5/2016 | Dowdall | ............ G06K 9/00362 |
| 9,377,315 B2 | 6/2016 | Grover et al. | |
| 9,977,243 B2 | 5/2018 | Jung | |
| 2006/0136846 A1 | 6/2006 | Im et al. | |
| 2010/0185341 A1 | 7/2010 | Wilson et al. | |
| 2010/0235034 A1 | 9/2010 | Higgins | |
| 2013/0155237 A1 | 6/2013 | Paek et al. | |
| 2013/0162792 A1 | 6/2013 | Lee et al. | |
| 2013/0249669 A1 | 9/2013 | Zwiener | |
| 2013/0267194 A1* | 10/2013 | Breed | ................... G08G 1/205 |
| | | | 455/404.2 |
| 2014/0300449 A1 | 10/2014 | Kounavis | |
| 2015/0081169 A1 | 3/2015 | Pisz | |
| 2015/0120124 A1 | 4/2015 | Bartels et al. | |
| 2015/0166062 A1* | 6/2015 | Johnson | ................ B60W 10/20 |
| | | | 701/41 |
| 2015/0279131 A1 | 10/2015 | Nespolo | |
| 2015/0339928 A1 | 11/2015 | Ramanujam | |
| 2016/0012301 A1 | 1/2016 | Arndt et al. | |
| 2016/0167648 A1 | 6/2016 | James et al. | |

FOREIGN PATENT DOCUMENTS

| | | |
|---|---|---|
| CN | 102883914 A | 1/2013 |
| CN | 103182983 A | 7/2013 |
| CN | 103269915 A | 8/2013 |
| CN | 103911508 A | 7/2014 |
| CN | 103927789 A | 7/2014 |
| CN | 104065722 A | 9/2014 |
| CN | 104750242 A | 7/2015 |
| CN | 205330369 U | 6/2016 |
| CN | 105799616 A | 7/2016 |
| DE | 102012017934 A1 | 3/2014 |
| DE | 102013207223 A1 | 10/2014 |
| DE | 102013021853 A1 | 6/2015 |
| DE | 102014111023 A1 | 2/2016 |
| DE | 102015219463 A1 | 4/2016 |
| DE | 102015001197 A1 | 8/2016 |
| JP | 2015191641 A | 11/2015 |
| TW | M 447334 U | 2/2013 |

OTHER PUBLICATIONS

International Preliminary Report on Patentability directed to related International Patent Application No. PCT/EP2017/073093, dated Mar. 19, 2019, with attached English-language translation; 14 pages.

Chinese Application No. 201780056642.5, Office Action dated Aug. 18, 2021 with attached English translation from EPO Global Dossier; 20 pages.

\* cited by examiner

METHOD FOR OPERATING A MOTOR VEHICLE

TECHNICAL FIELD

An embodiment of the disclosure relates to a method for operating a motor vehicle having a camera device that records the area ahead of the vehicle, as well as an associated control device for evaluating images recorded by the camera.

BACKGROUND

The development of motor vehicles that perform more and more tasks autonomously is steadily increasing. There are already vehicles known that drive largely independently, i.e. self-driving or piloted motor vehicles, in which a driver must merely be present in order to assume control of the vehicle in the event of an emergency, as well vehicles known that drive in traffic completely autonomously even without a driver present. Substantially or entirely self-driving motor vehicles such as these can be employed, for example, as a kind of taxi or the like, namely vehicles serving as passenger transport.

In typical taxis or the like, which are configured as conventional motor vehicles and have a driver, it has heretofore often been the case that the taxi drives up to a taxi stand, for example. If a passenger is on the roadside and sees the approaching taxi, he or she typically waves, i.e. makes a calling hand gesture, which the driver sees, whereupon the taxi stops to pick up the person. A taxi waiting at a traffic light, for instance, can also be called in this way. In the case of a self-driving motor vehicle that does not have a driver on board, as described, there is no person to recognize the calling gesture.

However, in conventional taxis with a driver, the problem also sometimes arises that the driver does not recognize the person standing and waving, making a calling gesture on the roadside, and therefore fails to identify the stop request and consequently cannot pick up the person.

Calling a driverless vehicle with the aid of a transmitter that is moved by a person is known from US 2015/0279131 A1. The transmitter triggers a corresponding control signal to be sent to the motor vehicle when the transmitter is moved with sufficient force by the person holding it. The vehicle can then automatically drive to the person.

Calling an autonomously driving motor vehicle by means of a mobile radio device, such as a mobile telephone, e.g. using an application stored on it, is known from US 2015/0339928 A1 as well as from DE 10 2015 219 463 A1.

SUMMARY

Aspects of the approach described herein include a method for operating a motor vehicle, where the method includes the step of taking images with a camera device that is recording an area ahead of the motor vehicle, and where the motor vehicle is a self-driven vehicle. The method further includes the step of evaluating the images by a control device, where the evaluating includes detecting for at least one hand gesture performed by a person shown in the images, and where the at least one hand gesture indicates the person is requesting to be picked up. The method also includes the step of in response to determining that the at least one hand gesture indicates the person is requesting to be picked up, controlling the motor vehicle to stop in the vicinity of the person to allow the person to board the motor vehicle, where the at least one hand gesture further indicates a number of passengers to be picked up by the motor vehicle using a number of raised fingers on any hand of the person performing the at least one hand gesture. Finally, the method incudes the step of in response to determining that the number of passengers to be picked up is greater than a number of free seats available in the motor vehicle, sending a call signal automatically to another automatically piloted motor vehicle, where the call signal comprises a position coordinate of the motor vehicle.

Aspects of the approach also include a method for operating a motor vehicle, where the method includes the step of taking images with a camera device that is recording an area ahead of the motor vehicle, where the vehicle is a non-self-driving vehicle driven by a driver. The method further includes the step of evaluating the images with a control device, where the control device evaluates the images to detect for at least one hand gesture performed by a person shown in the images, and where the at least one hand gesture indicates the person is requesting to be picked up. The method also includes the step of giving the driver of the motor vehicle a signal indicating a stop request when a hand motion describing a gesture that indicates the person is requesting to be picked up. In addition, the method includes the step of controlling the motor vehicle to stop in the vicinity of the person to allow the person to board the motor vehicle, where the at least one hand gesture further indicates a number of passengers to be picked up by the motor vehicle using a number of raised fingers on any hand of the person performing the at least one hand gesture. The method also includes the step of in response to determining that the number of passengers to be picked up is greater than a number of free seats available in the motor vehicle, sending a call signal automatically to another automatically piloted motor vehicle, wherein the call signal comprises a position coordinate of the motor vehicle.

Aspects of the approach described herein include a motor vehicle configured for piloted driving that includes a camera device configured to record images of an area ahead of the vehicle, and a control device. The control device is configured to evaluate the images by detecting at least one hand gesture performed by a person shown in the images, where the at least one hand gesture indicates the person is requesting to be picked up. The control device is further configured to, in response to determining that the at least one hand gesture indicates the person is requesting to be picked up, control the motor vehicle to stop in the vicinity of the person to allow the person to board the motor vehicle, where the at least one hand gesture further indicates a number of passengers to be picked up by the motor vehicle using a number of raised fingers on any hand of the person performing the at least one hand gesture. The control device is further configured to, in response to determining that the number of passengers to be picked up is greater than a number of free seats available in the motor vehicle, sending a call signal automatically to another automatically piloted motor vehicle, wherein the call signal comprises a position coordinate of the motor vehicle.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

Figure 2:
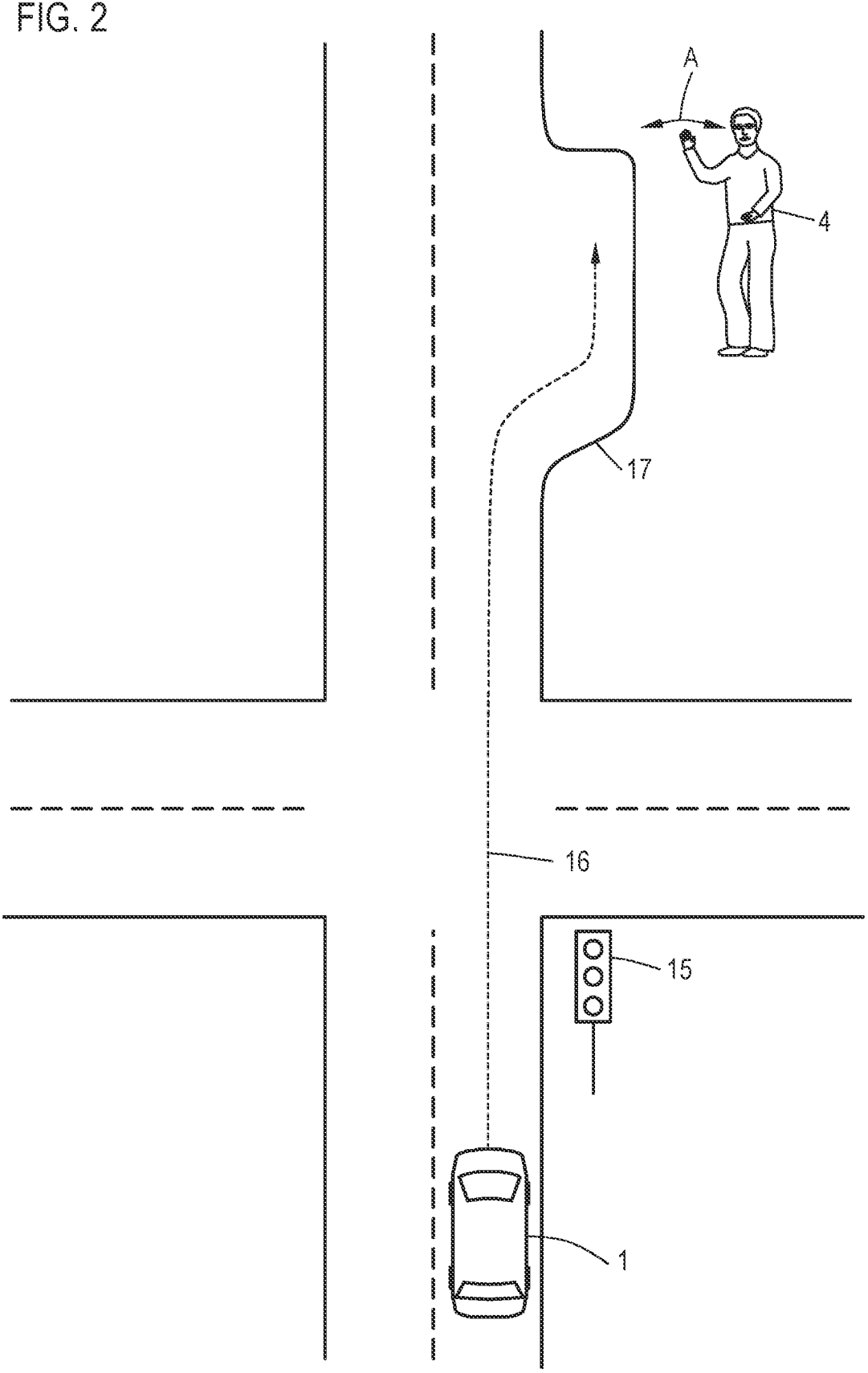

FIG. 1 shows a schematic diagram of the motor vehicle according to the invention and further relevant device components, and FIG. 2 shows a schematic diagram of a typical traffic and/or call situation.

DETAILED DESCRIPTION

An embodiment addresses the problem of indicating an improved method for operating a motor vehicle.

In a method of the type described above, the aforementioned problem is solved according to said method by providing that a control device that evaluates images in order to detect at least one hand gesture performed by a person shown in the images. For example, when a hand motion describing a calling gesture that indicates a stop request is detected, either the self-driving motor vehicle is controlled to stop in the vicinity of the person, or the driver of the motor vehicle is given a signal indicating the stop request.

According to the invention, a continuous detection of the area in front of the vehicle is performed by the camera device. A control device continuously evaluates images recorded by the camera to determine whether a person is shown in the images. If a person is detected, the device evaluates whether said person is performing a hand motion, i.e. is making a gesture, that can be considered a calling gesture indicating a stop request. Thus an image evaluation is carried out by means of the control device to determine whether a person located in the vehicle surroundings is signaling by waving or making a similar defined calling gesture, such that he or she would like to be picked up by the motor vehicle.

The rest of the method is carried out differently, depending upon the configuration of the motor vehicle, i.e. whether it is a self-driving motor vehicle or a vehicle with a driver. If it is a self-driving vehicle without a driver, then, after detecting the gesture indicating a stop request, the self-driving motor vehicle is automatically steered to the vicinity of the person and stopped so that the person can get in. Thus through a fully automatic operation, it is possible to detect a ride request and to steer the vehicle to the person in question to pick them up.

If the motor vehicle is a conventional motor vehicle with a driver, then the driver is given a corresponding signal that signals the stop request, such as an optical signal by blinking or a notification on a display, an acoustic signal, such as in the form of a voice output, or a haptic signal, and/or a combination of different signals at the same time. The driver can then deliberately stop the vehicle as soon as he or she has identified the waving person whom he or she might have previously overlooked.

This means that the detection of the passenger request according to the embodiment, and the corresponding control of the vehicle, as well as the transmission of the signal that signals the stop request, ensures that a corresponding passenger request is identified only by detecting a hand motion or gesture and that the vehicle can be controlled accordingly.

In each case, visual or acoustic feedback indicating that the stop request has been recognized can be given to the person making the gesture, e.g. by activating the illumination or a taxi sign, a message on a display or the like.

The hand motion can be detected by the control device and, for example, can be compared with gesture or reference samples that have been defined in a gesture or motion pool beforehand and that can also be learned by the motor vehicle beforehand. If it is determined that the performed hand gesture corresponds to a reference sample, a ride request can be deduced from the hand gesture. If it is determined that the gesture does not match the gesture or reference sample, then the detected hand motion is not evaluated as a gesture indicating a stop request and is dismissed. The sample pool can be configured differently by region, for example; in other words, it can be adapted to European or North American behavioral patterns, for instance.

The method according to the embodiment thus permits the detection of gestures that signal a stop. In order to verify the concrete stop request even further, the control device according to one advantageous embodiment can further evaluate the images to detect the person's viewing direction, wherein the motor vehicle is controlled to stop in the vicinity of the person when the viewing direction corresponds to a defined viewing direction. Accordingly, not only the hand gesture but also the viewing direction is detected and evaluated. This is because it is assumed that the person who is "waving" to the motor vehicle will also be looking in the motor vehicle's direction when doing so. The camera device or control device is thus capable of detecting the viewing direction based on the head position and/or eye position of the person. If said position is oriented toward the motor vehicle, then this corresponds, for example, to a previously defined viewing direction; the hand gesture detected in parallel is accordingly verified as a "stop gesture" in this way. However, if the person is looking in another direction, then the hand motion is not necessarily a motion indicating a stop request, or it is not intended for the motor vehicle, but rather it is possibly for a different vehicle, and so the hand motion is dismissed on the basis of the negative detection of the viewing direction.

Moreover, it is possible to classify the hand motion by means of the control device, wherein the hand motion is considered or dismissed depending upon the classification. In this way, the hand motion can be grouped into a classification pattern, so to speak, by which it can be qualified in greater detail in terms of the explicitness with which the motion indicates a stop request. It is thereby possible to determine the degree of certainty or uncertainty with which the stop request was detected. Using this classification, hand motions that tend to represent derogatory gestures can be ruled out and not interpreted as hand motions leading to a stop.

People who want to stop a motor vehicle such as a taxi will occasionally also call out or whistle. Accordingly, any calling or whistling sound by a person can be detected by a microphone on board the motor vehicle, for example, and can be evaluated by the control device and considered in the control of the driving operation. In this instance, not only camera-based data but also acoustic data recorded by the microphone are evaluated. To evaluate calls, the control device is configured with respect to the respective local language of the country in which the vehicle is travelling.

When a person is waving to a motor vehicle, such as a taxi, this can mean that only this person would like to get in, i.e. that only one person would like to use the vehicle. It is also possible, however, that multiple persons would like to get into the vehicle, although only one person is waving to the motor vehicle. According to one embodiment, the number of raised fingers on the hand performing the hand motion or on the second hand of the person shown in the image can be detected by the control device in order to obtain information about the prospective number of boarding passengers, where this is possible, and this number can be processed as information indicating the number of passengers to be picked up. It is possible, for example, that the person performs the hand motion for the pick-up gesture with his or her right hand, while the other hand is raised with three spread fingers, for instance. The control device can then detect the number of fingers and derive therefrom that a total of three people would like to board the vehicle.

If the detected number of passengers who are to be picked up is greater than the number of free seats available in the motor vehicle and the vehicle in question is consequently not suitable to fulfill the ride request, then a call signal can automatically be sent to a separate, further piloted motor vehicle, said call signal containing the position coordinate for the automatic approach of the further motor vehicle. The motor vehicle itself can also emit a visual message to the calling person via a display, for example, to indicate that it is not suitable or available to fulfill the ride request. It is also possible, via said display, to communicate to the calling person that an automatic call signal has already been transmitted to another piloted motor vehicle that would arrive shortly, possibly while indicating information regarding how long it will take until that vehicle arrives.

The person or multiple persons occasionally also have luggage with them. In this case, it is possible that the control device detects one or more items of luggage belonging to the person, wherein the trunk of the motor vehicle may be automatically opened when at least one item of luggage is detected. Thus another image analysis is carried out here, as well, to determine whether and, if so, how many items of luggage, such as larger bags or suitcases, are shown in the image next to the person performing the hand motion. From this it can then be deduced that, for instance, two additional bags or suitcases are to be picked up. Upon reaching the final approach position, i.e. when the motor vehicle has arrived at the target position close to the waving person, the trunk of the motor vehicle is automatically opened, possibly depending upon the size of the item or items of luggage, so that the person can load the luggage. Alternatively, an inquiry can be sent to the person to determine whether the trunk should be opened. A response, e.g. again by means of a gesture, can be detected and the system can react appropriately to it.

It is also possible that a motor vehicle call system, as it were, is established, in which a person who wishes to participate can sign up on-line. Said person can thus register for this service and receives, for example, an object to be carried, such as a key with a chip, or a corresponding application that can be activated on the mobile telephone, which serves to identify the person. According to an embodiment, a personal identification signal that is transmitted by the object carried by the person is detected by a detection device on board the vehicle. For example, this signal can be transmitted continuously or when a button or key or the like is actuated. The control device detects this personal identification signal and can then determine by means of an internal data reconciliation process, for example, whether or not the person is registered, i.e. is authorized for the service.

If so, then the car can stop; if not, then the stop request is not honored, which may also be indicated to the person.

In a development of the invention, the detected personal identification signal can also be relayed to an external data processing system for identification and/or for billing purposes and/or for obtaining personal information, which is transmitted from the data processing system to the detection device. Accordingly, the identification or verification can take place in the external data processing system, and so it is more or less ensured by the external data processing system that only registered persons can use the service. Additionally, a bill can be created, for example via an account that is associated with the person and stored in the data processing system. If the motor vehicle provides appropriate information via the control device indicating that the person has actually boarded the vehicle, the bill can be created. For example, a flat sum can be deducted if the journey is being taken at a flat rate. Alternatively, a corresponding journey end signal can be sent to the data processing system once the journey has ended so that the actual distance can be billed.

Alternatively or additionally, personal information can be retrieved from the data processing system, such as the person's typical destinations, a seat position usually set by the person or other personal information that are required for the driving operation.

It is not always possible for a detected ride request to be serviced immediately, such as when the motor vehicle is stopped at a traffic light and must wait for the green phase. It is possible here that the person is signaled by a visual or acoustic signal output device whether the motor vehicle will stop, in other words, that the stop request was detected and/or how long it will take until it stops. In this way, the person receives information indicating that his or her ride request has been recorded, but also information as to approximately how long he or she must wait until the motor vehicle arrives. The signal device can be on the vehicle itself, e.g. the front illumination can be activated for this purpose or a taxi sign or a display device can display a message. However, information can also be transmitted to the object carried by the person, such as a smartphone, and the signal may be emitted to there.

In addition to the method itself, another embodiment further relates to a motor vehicle that is configured for piloted driving, having a camera device that records the area ahead of the vehicle and an associated control device for evaluating the images, which is configured to carry out the described method.

All statements relating to the method embodiment apply equally with respect to the motor vehicle embodiment that is configured accordingly.

Further advantages and details are found in the following described exemplary embodiment and on the basis of the drawing. The following is shown:

FIG. 1 a schematic diagram of the motor vehicle according to the invention and further relevant device components, and FIG. 2 a schematic diagram of a typical traffic and/or call situation.

FIG. 1 shows a schematic diagram of a motor vehicle according to the invention as well as a relevant situation to illustrate the method according to the invention.

A motor vehicle 1 according to the invention is shown, having a camera device 2 that records the area ahead of the vehicle and an associated control device 3, which serves to process the image data of the camera device 2.

Also shown is a person 4, who is making an essentially waving hand motion with his right hand 5 by moving the hand from right to left multiple times, as is indicated by the double arrow A. This hand motion is intended to signal to the motor vehicle 1, which is a self-driving taxi, for example, that the person standing at the roadside would like to be picked up. Accordingly, the waving is a gesture that describes a stop request.

With his left hand 6, the person 4 is indicating that only one person should be picked up. This is represented by the one raised finger 7.

The camera device 2 then records images of the area ahead of the vehicle including the person 4. The control device 3 analyzes the continuously incoming images for the presence of a person, which means that the person 4 is detected as such in the present case. Furthermore, the control device 3 analyzes whether the person is performing corresponding motion patterns or hand motions that describe a possible gesture indicating a stop request. The control device 3 detects the waving of the hand 5 in this instance. The detected hand motion is analyzed and, for instance, compared with reference gestures or reference motions that have been stored in a memory beforehand. The reference gestures or reference motions can be trained, for example, but they can also be stored as an existing data set. This data set can contain a multitude of local or national conventional hand motions that are used to hail a taxi or the like. It is also possible to group the hand motions by nation, that is to say that a corresponding data set describing the typical European hand motions is stored in the European area, while a reference data set specific to the USA is stored in the US area.

Moreover, the control device 3 is also capable of determining from the camera images the direction in which the person 4 is looking. For example, an established stop request can be verified as such by a detection of the viewing direction. This is because the person 4 usually initiates eye contact with the motor vehicle 1 when it recognizes him or her and when he or she would like to signal a stop request to it. If, however, the person 4 is looking in a different direction and is nevertheless performing the hand motion, it can be assumed that the hand motion is likely a random movement or a gesture intended for someone else or the like. This means that the detection of viewing direction can likewise aid in verifying the gesture as long as the detection of the viewing direction is possible on an individual basis.

If the control device 3 then determines a hand motion indicating a stop request, possibly verified by detecting the viewing direction, then, based on this information, the motor vehicle 1 can be deliberately controlled by the control device 3 to stop in the vicinity of the person.

At the same time, the control device 3 also detects the raised finger 7 on the second hand 6 and deduces from this that only this person would like to be picked up, in other words that no additional people want to board the vehicle. As a function of the detected number of people, a comparison is made as to whether the indicated number of people can be sufficiently accommodated in the vehicle or whether the number of people exceeds the number of available seats. In the former case, the motor vehicle 1 stops in the vicinity of the person; in the latter case, for example, another motor vehicle that has the appropriate passenger capacity can automatically be called by means of a corresponding call signal. A response can be sent to the person informing him or her of this fact.

Furthermore, it is also possible for the control device 3 to detect from the camera images whether the person 4 has an item of luggage 8 with him or her that needs to be stowed. The control device 3 can be configured to detect the luggage size, as well. If it is determined that the person 4 is carrying only one small bag that can easily be accommodated in the vehicle, for instance, then this is recorded, but a specific action does not take place. However, if it is determined that the item of luggage 8 is a larger suitcase, then the trunk can be automatically opened, for instance, so that the person 4 can stow the luggage 8. If the luggage cannot be stowed in the trunk, it is indicated to the person that the luggage should be stowed in the interior of the vehicle. A possibly open trunk is automatically closed at the beginning of the journey.

As FIG. 1 shows, the person 4 is carrying an object 9, here in the form of a bracelet, on which the transmission or transponder device 10 is arranged. The control device 3 communicates with a transmitting and receiving device 11, wherein the control device is capable of detecting a personal identification signal sent by the transmission or transponder device 10. The personal identification signal can include, for instance, the name of the person or specific driving preferences or the like. Of course, the personal identification signal can also include a personal code so that no real names are transmitted.

On the basis of the personal identification signal, the control device 3 can then record corresponding information about this person by means of an internal storage device, for example, in which corresponding reference data are stored. Alternatively, it is possible that the control device 3 transmits the personal identification signal to an external data processing system 12 via the transmitting and receiving device 11, as is represented by the double arrow B. Corresponding information about the person who is identified by the personal identification signal is stored there. This is bidirectional communication, which means that corresponding information is also transmitted back to the transmitting and receiving device 11 from the data processing system 12 and is then processed by the control device 3. Using this personal identification signal, it is possible to record, for example, whether the person 4 is authorized to make use of the driving service at all. This is the case, for instance, when the system is one on which a user must register as a subscriber. Only if the person 4 is identified as a registered subscriber can the automatic approach operation even take place. Additionally or alternatively, the person could also be identified by a vehicle-mounted camera system. Following the recorded identification, the data processing system 12 can also automatically bill for the upcoming journey if it is clear that the person 4 has also actually carried out the journey, and the like.

Once the ride request has been detected and the decision has been made that the ride request will be processed and that the motor vehicle 1 will pick up the person 4, it can be signaled to the person 4 via a front-side display device 13, for example, that the stop request has been recorded and the vehicle is approaching. If appropriate, information regarding how long it will take until the motor vehicle 1 arrives can also be provided in this way. If the ride request cannot be serviced, information indicating that the motor vehicle 1 will not approach can also be provided.

As soon as all evaluations have been completed and it is clear that the motor vehicle will pick up the person 4, the control device 3 activates a corresponding drive device 14 of the motor vehicle, whereupon the vehicle automatically begins to move and drives to the person 4 to pick him or her up.

FIG. 2 shows a typical situation, in which the person 4 is standing beyond an intersection, while the motor vehicle 1 is stopped before the intersection at a traffic light 15 that is displaying a red light, for example. In this situation, the person 4 has recognized the motor vehicle 1 as a taxi that, in principle, could pick him up. Of course, the motor vehicle 1 can have appropriate taxi markings or the like for this purpose.

The person 4 then waves, as is represented by the double arrow A, with a corresponding hand motion that indicates the ride request, wherein the motor vehicle 1 detects this motion and makes the decision, according to the processes described above, that the person 4 will be picked up.

As soon as the traffic light 5 turns green, the motor vehicle 1 begins to move along the dotted path 16 shown in FIG. 2 and drives in the direction of the person 4, who is standing, for instance, next to a parking lane 17. The motor vehicle may be an independent, i.e. autonomously, driving motor vehicle 1, which subsequently steers automatically into the parking lane 17 and stops next to the person 4 so that he can get in.

As soon as the destination of the journey is clear, the motor vehicle 1 with the person begins to move and carries out the transport. Having arrived at the destination, the transmitting and receiving device 11 can transmit a signal to the external data processing system 12, for example, indicating that the journey has been successfully concluded, whereupon the billing can be carried out there. Of course, it is also possible to pay in the motor vehicle 1 if an appropriate automatic payment apparatus is provided.

In the example shown in FIG. 1, the person 4 is wearing a bracelet with a transmitter 10. Alternatively, this can be a key with a chip or an application that is downloaded onto the mobile telephone of the person 4. In the latter case, the person can wave with his hand 5 and, either beforehand or afterward, virtually identify himself to the external data processing system 12 using the application on the mobile telephone or identify himself to the control device 3 using the transmitting and receiving device 11. Any payment information or typical destinations or other personalization measures, such as seat position and enabled features and services, can also already be communicated via this application to the external processing system 12 or the control device 3 before getting into the vehicle. As a result, the person does not have to wait until getting into the vehicle to register or enter a destination if one can possibly already be recorded in this way. In addition, an identification of the potential passenger before stopping in combination with the gesture already permits a preselection from various differently priced service categories to be presented to the potential passenger, for instance, if the passenger wants a particular vehicle category. If the motor vehicle 1 is of the desired vehicle category, then the ride request can be fulfilled. If not, then an appropriate call signal can be sent via the transmitting and receiving device 11 to another motor vehicle in the vicinity that is consistent with the category. This, too, can then be announced to the person 4 via the display device 13, but possibly also via a corresponding message sent to the mobile telephone or the like. Any given communications options are possible here.

The example above assumes a completely autonomously driving vehicle. However, if it is a vehicle that is only semi-autonomous or else completely autonomous but requires a driver to be present, then the method and/or the system according to the invention can be applied in the same manner. In this case, unlike in the example described above, after a ride request is detected a notification is displayed via a suitable display device facing the driver and makes the driver aware of the person 4. This is because the driver can overlook the waving person standing on the roadside, especially in heavier traffic. After a signal to the driver, the driver himself can then maneuver the motor vehicle 1 to the person 4 if he himself must drive, or alternatively the motor vehicle 1 can drive largely autonomously in this case, as well, but with additional information from the driver.

The invention claimed is:

1. A method for operating a motor vehicle, the method comprising:
   taking images with a camera device that is recording an area ahead of the motor vehicle, wherein the motor vehicle is a self-driven vehicle;
   evaluating the images by a control device, wherein the evaluating includes detecting for at least one hand gesture performed by a person shown in the images, wherein the at least one hand gesture indicates the person is requesting to be picked up;
   in response to determining that the at least one hand gesture indicates the person is requesting to be picked up, controlling the motor vehicle to stop in a vicinity of the person to allow the person to board the motor vehicle,
   wherein the at least one hand gesture further indicates a number of passengers to be picked up by the motor vehicle using a number of raised fingers on any hand of the person performing the at least one hand gesture; and
   in response to determining that the number of passengers to be picked up is greater than a number of free seats available in the motor vehicle, sending a call signal automatically to another automatically piloted motor vehicle, wherein the call signal comprises a position coordinate of the motor vehicle.

2. The method of claim 1, wherein the evaluating further includes evaluating the images to detect a viewing direction of the person, and wherein the controlling the motor vehicle to stop in the vicinity of the person occurs when the viewing direction corresponds to a defined viewing direction.

3. The method of claim 2, wherein the viewing direction of the person is determined based on a head position or an eye position of the person, and an orientation direction of the head position or the eye position.

4. The method of claim 1, further comprising:
   classifying a hand motion by the control device, wherein the hand motion is considered or dismissed according to a classification of the hand motion.

5. The method of claim 1, further comprising:
   detecting, by a microphone on board the motor vehicle, acoustic data comprising a calling or whistling sound by the person,
   wherein the evaluating by the control device further includes considering the detected acoustic data in the operating the motor vehicle.

6. The method of claim 5, further comprising detecting, by the control device, a stop request based on the detected acoustic data.

7. The method of claim 1, further comprising:
   detecting, by the control device, one or more items of luggage belonging to the person based on analysis of the images; and
   automatically opening a trunk of the motor vehicle upon detecting at least one item of luggage.

8. The method of claim 7, further comprising detecting a size of the at least one luggage item, and
   in response to determining that the size of the at least one luggage item is above a predetermined threshold value, automatically opening the trunk of the motor vehicle.

9. The method of claim 1, further comprising detecting a personal identification signal based on an object carried by the person.

10. The method of claim 9, further comprising relaying the detected personal identification signal to an external data processing system for identification, billing purposes, or obtaining personal information of the person.

11. The method of claim 10, wherein the relaying of the detected personal identification signal from the detection device to the external data processing system and vice versa occurs through the control device transmitting and receiving the detected personal identification signal through a transmitting and receiving device.

12. The method of claim 1, further comprising sending a visual or acoustic signal to the person using an output device, wherein the visual or acoustic signal indicates whether the motor vehicle will make a stop or how long the motor vehicle will take until it stops.

13. A method for operating a motor vehicle, the method comprising:
   taking images with a camera device that is recording an area ahead of the motor vehicle, wherein the motor vehicle is a non-self-driving vehicle driven by a driver;
   evaluating the images with a control device, wherein the control device evaluates the images to detect for at least one hand gesture performed by a person shown in the images, wherein the at least one hand gesture indicates the person is requesting to be picked up;
   giving the driver of the motor vehicle a signal indicating a stop request when a hand motion describing a gesture indicates the person is requesting to be picked up;
   stopping, based on input from the driver, the motor vehicle in a vicinity of the person to allow the person to board the motor vehicle,
      wherein the at least one hand gesture further indicates a number of passengers to be picked up by the motor vehicle using a number of raised fingers on any hand of the person performing the at least one hand gesture; and
   in response to determining that the number of passengers to be picked up is greater than a number of free seats available in the motor vehicle, sending a call signal automatically to another piloted motor vehicle, wherein the call signal comprises a position coordinate of the motor vehicle.

14. The method of claim 13, further comprising displaying the signal indicating the stop request to the driver.

15. A motor vehicle configured for piloted driving, comprising:
   a camera device configured to record images of an area ahead of the motor vehicle; and
   a control device configured to:
   evaluate the images by detecting at least one hand gesture performed by a person shown in the images, wherein the at least one hand gesture indicates the person is requesting to be picked up;
   in response to determining that the at least one hand gesture indicates the person is requesting to be picked up, control the motor vehicle to stop in a vicinity of the person to allow the person to board the motor vehicle,
      wherein the at least one hand gesture further indicates a number of passengers to be picked up by the motor vehicle using a number of raised fingers on any hand of the person performing the at least one hand gesture; and
   in response to determining that the number of passengers to be picked up is greater than a number of free seats available in the motor vehicle, sending a call signal automatically to another automatically piloted motor vehicle, wherein the call signal comprises a position coordinate of the motor vehicle.

16. The motor vehicle of claim 15, wherein the control device is further configured to detect a stop request based on the at least one hand gesture performed by the person shown in the images.

17. The motor vehicle of claim 15, wherein the motor vehicle further comprises a microphone configured to record acoustic data, and wherein the control device is further configured to analyze the acoustic data for determining a stop request by the person.

18. The motor vehicle of claim 15, wherein the control device is further configured to:
   evaluate the images to detect a viewing direction of the person; and
   detect the at least one hand gesture in response to the evaluated images indicating the viewing direction of the person is towards the motor vehicle.

* * * * *